(12) United States Patent
Shaw et al.

(10) Patent No.: US 11,126,655 B2
(45) Date of Patent: Sep. 21, 2021

(54) METADATA OF PARTIAL CONTENT

(71) Applicant: PIKSEL, Inc, Wilmington, DE (US)

(72) Inventors: Philip Shaw, York (GB); Paul Mardling, London (GB); Mark Christie, London (GB)

(73) Assignee: PIKSEL, INC., Wilmington, DE (US)

( * ) Notice: Subject to any disclaimer, the term of this patent is extended or adjusted under 35 U.S.C. 154(b) by 80 days.

(21) Appl. No.: 15/751,784

(22) PCT Filed: Aug. 11, 2016

(86) PCT No.: PCT/EP2016/069155
§ 371 (c)(1),
(2) Date: Feb. 9, 2018

(87) PCT Pub. No.: WO2017/025605
PCT Pub. Date: Feb. 16, 2017

(65) Prior Publication Data
US 2018/0239773 A1  Aug. 23, 2018

(30) Foreign Application Priority Data
Aug. 11, 2015 (GB) .................................. 1514187

(51) Int. Cl.
*G06F 16/00* (2019.01)
*G06F 16/78* (2019.01)
*G06F 16/735* (2019.01)
*G06F 16/738* (2019.01)
*G06F 16/2457* (2019.01)
*G06F 16/9535* (2019.01)

(52) U.S. Cl.
CPC .... *G06F 16/7867* (2019.01); *G06F 16/24578* (2019.01); *G06F 16/735* (2019.01); *G06F 16/738* (2019.01); *G06F 16/9535* (2019.01)

(58) Field of Classification Search
CPC .... G06F 16/00; G06F 16/7867; G06F 17/738; G06F 16/9535; G06F 16/24578; G06F 16/735
See application file for complete search history.

(56) References Cited

U.S. PATENT DOCUMENTS

2007/0223871 A1* 9/2007 Thelen ................. G11B 27/034
386/280
2010/0071005 A1* 3/2010 Kusunoki ............. G06Q 30/02
725/46

(Continued)

OTHER PUBLICATIONS

International Search Report and Written Opinion, European Patent Office, dated Oct. 14, 2016.

(Continued)

*Primary Examiner* — Khanh B Pham
(74) *Attorney, Agent, or Firm* — Holzer Patel Drennan

(57) ABSTRACT

There is disclosed a method comprising: receiving one or more items of metadata associated with an item of content, each of the items of metadata identifying a characteristic of a part of the item of content; receiving one or more items of user behaviour information corresponding to an engagement of a user with one or more parts of the item of content; and linking the metadata to the user behaviour in dependence on user engagement for the part of the content associated with the metadata.

18 Claims, 10 Drawing Sheets

(56) References Cited

U.S. PATENT DOCUMENTS

| | | | |
|---|---|---|---|
| 2010/0199295 A1* | 8/2010 | Katpelly | H04L 67/306 |
| | | | 725/14 |
| 2014/0122502 A1 | 5/2014 | Kalmes et al. | |
| 2015/0019573 A1* | 1/2015 | Kalmes | G06F 16/284 |
| | | | 707/751 |
| 2016/0066035 A1* | 3/2016 | Chesluk | H04N 21/4532 |
| | | | 725/109 |
| 2016/0274744 A1* | 9/2016 | Neumann | H04N 21/252 |

OTHER PUBLICATIONS

Manzat, et al., "Towards a User-aware Enrichment of Multimedia Metadata", $12^{th}$ International Workshop of the Multimedia Metadata Community, Semantic Multimedia Database Technologies, Dec. 2, 2010.

Peregudov, et al., "Enrichment of Semantic Metadata Based on Interactions with User Associations" Consumer Electronics, 2004 IEEE International Symposium on Reading, Sep. 1, 2004.

Summons to Attend Oral Proceedings, from corresponding EP application 16750837.3, dated Sep. 16, 2020.

* cited by examiner

METADATA OF PARTIAL CONTENT

BACKGROUND OF THE INVENTION

Field of the Invention

The present invention is concerned with the use of metadata linked to content. The invention is particularly but not exclusively concerned with improving recommendations and/or advert generation.

Description of the Related Art

Typical recommendation systems use metadata about content items that provide a description of the item as a whole. For example, an episode of "Game of Thrones" might be described using a genre, together perhaps with a sub-genre, a description, a collection of cast and crew and an assortment of tags that pick out key elements of action from the episode.

Other recommendation systems may have access to more detailed information that describes each piece of content on a per scene level or finer. Such metadata may comprise a timeline of tags or other properties that indicate when, during the extent of each programme, a particular concept or entity arises.

For example, such a timeline for a movie that contains a car chase scene, a monologue about San Francisco, a cameo of a famous sports personality and a plot-twist may include a 'car-chase' tag that spans that entire section of the movie, a 'San Francisco' tag placed at the point where it is mentioned, a 'John McEnroe' tag when he appears on screen and a story-arc marker around the plot twist section.

These tags allow a recommendation engine to reach into content and identify key moments of interest to viewers searching for content.

Services that analyse content and provide this level of metadata to recommendation systems and other services are known. Likewise, it is known that a viewer may use these tags, keywords and themes to navigate content in much finer detail. They can, for instance, search of 'car chase' and receive back a list of all car chase scenes within movies that the system recommends for them.

The system may also infer a fondness for movies that feature car-chases from a viewer's content consumption history and use this as an explicit basis for recommendations.

SUMMARY

However, what is missing is a more careful compilation of a viewer's content consumption history A recommendation system typically has access to a store of user profile data that contains, amongst other things, various aspects of each user's content consumption history: what they have watched, what they have rated, liked, commented on, shared, favourited, bookmarked and so on.

This graph of what may be both positive and negative items of user feedback is used by a typical recommendation system to guide its decision making when next compiling a list of content recommendations.

If a user tunes into a movie on BBC1, for example, that is thirty minutes in and really enjoys it, they might 'Like' or otherwise rate it favourably. Such a recommendation system might take this input to mean that the user liked every aspect of it.

However, since the user missed the beginning this assumption is unsound: an opening section of mature content, a disliked actor playing a character who gets killed off in the first part of the movie, etc. . . . may all make this generalisation problematic.

This may be a particular issue for recommendation systems that have an awareness of scene-level data. Such a system receiving a 'Like' for the movie as a whole may incorrectly deduce that the viewer would be happy to see other pieces of content that contain passages similar to those in the missed section of the movie.

To address any of these or other considerations, there may be provided various embodiments as follows. Any of the features of any of the aspects or embodiments discussed below may be applied independently of one another or in any combination.

In one aspect there is provided a method comprising receiving one or more items of metadata associated with an item of content, each of the items of metadata identifying a characteristic of a part of the item of content; receiving one or more items of user behaviour information corresponding to an engagement of a user with one or more parts of the item of content; and linking the metadata to the user behaviour in dependence on user engagement for the part of the content associated with the metadata.

A user profile for the user may be updated based on the linked metadata. The user behaviour may comprise user feedback, wherein the metadata may be weighted in dependence on the user feedback. The metadata may be weighted in dependency on time proximity of the metadata prior to the feedback, wherein metadata more recent to the time of the feedback may be weighted to have a higher relevancy than metadata less recent from the time of the feedback. Future recommendations for the user may be based on the updated user profile.

The method may further comprise selecting auxiliary content for display to the user following a part of content in dependence at least in part on the linked metadata for that part. The method may further comprise selecting auxiliary content for display to the user within a part of content in dependence at least in part on the linked metadata for that part. The metadata may be weighted in dependence on time proximity to an end of that part, wherein metadata more recent to the end of that part is weighted to have a higher relevancy than metadata less recent from the end of that part. The auxiliary content may be an advert.

There may be provided a computer program product embodied on a computer-readable storage medium and configured so as when run on one or more processors to perform the operations as defined.

In another aspect there is provided a server comprising a metadata store for providing one or more items of metadata associated with an item of content, each of the items of metadata identifying a characteristic of a part of the item of content; an interface for receiving one or more items of user behaviour information corresponding to an engagement of a user with one or more parts of the item of content; and a processor for linking the metadata to the user behaviour in dependence on user engagement for the part of the content associated with the metadata.

The server may further comprise a user profile store, wherein a user profile in the user profile store is updated based on the linked metadata. The user behaviour information may include user feedback, wherein the processor is configured to weight the metadata in dependence on the user feedback. The processor may be configured to weight the metadata in dependency on time proximity of the metadata prior to the feedback, wherein metadata more recent to the time of the feedback is weighted to have a higher relevancy than metadata less recent from the time of the feedback. The server may further comprise a user recommendations engine configured to base future recommendations for the user on the updated user profile in the user profile store.

The processor may be configured to select auxiliary content for display to the user following a part of content in dependence at least in part on the linked metadata for that part. The processor may be configured to select auxiliary content for display to the user within a part of content in dependence at least in part on the linked metadata for that part. The processor may be configured to weight the metadata in dependence on time proximity to an end of that part, wherein metadata more recent to the end of that part is weighted to have a higher relevancy than metadata less recent from the end of that part. The auxiliary content may be an advert.

In an aspect disclosed herein, there is provided a method comprising: receiving one or more items of metadata associated with an item of audio and/or video content, each of the items of metadata indicating a respective event occurring within the content (e.g. a car chase, a particular advert, etc.). Each of the items of metadata preferably also includes an indication of a time or range of times at which the event occurs within the item of content (relative to the duration of the item of content). This may comprise a point in time at which the event occurs, or a period of time over which the event occurs (e.g. an indication of a particular scene). The method also comprises receiving one or more items of user behaviour information associated with the item of audio and/or video content, each of the items of user behaviour information indicating an engagement of a user with the item of content (i.e. an indication of consumption and/or interaction with the content). Each of the items of user-behaviour information preferably comprises an indication of a time or range of times of the user engagement. For example each of the one or more items of user behaviour information may indicate the fact that the user was consuming (watching or listening to) the content at or during the indicated time, and/or feedback given by the user in relation to the content at the indicated time. The method further comprises, based on the metadata and user behaviour information, determining an association between the user engagement and the one or more events, i.e. associating the user engagement with the items of metadata to which the user has thus been exposed or upon which the feedback can be accepted to have been based. For example, the determination of the association may comprise determining a timing of the user engagement relative to the events.

Based thereon, the method may further comprise determining a relevancy of the user engagement, and/or selecting auxiliary content to provide to the user or other users, e.g. to provide to the user or other users in association with said item of content.

According to another aspect there is provided a corresponding system configured to perform the method. According to another aspect, there is provided a corresponding computer program product embodied on a computer readable medium and configured so as when run on one or more processors to perform the method.

In another aspect disclosed herein, there are provided a system and respective method that enable inferring metadata of an asset on a scene and timeline level, and associating a user's behaviour with a selection of this metadata. The selection is dependent upon the extent and offset of the behavior within the asset. The behavior can be the viewing of the asset, the engagement with the asset like feedback, rating and others The association can be used to add, weight and filter metadata stored in the user profile.

The association can be used to affect the selection of embedded auxiliary content that varies in dependence on the content and the user's behavior and experience of it.

The user profile data can be used to improve recommendations of further and alternative content.

BRIEF DESCRIPTION OF THE FIGURES

The invention will now be described by way of reference to the accompanying drawings, in which.

DESCRIPTION OF EMBODIMENTS

The invention is described with reference to particular examples and embodiments, but is not limited to any examples unless explicitly stated.

User profile data that records user feedback only against those portions of content experienced is more likely to reflect each viewer's actual tastes and preferences.

When a user likes, rates or otherwise provides feedback while or after consuming a piece of content, a user profile system that has access to the kind of scene-level metadata defined above, should store this feedback against the content item itself and the keywords, tags and themes to which they were exposed.

Figure 1:
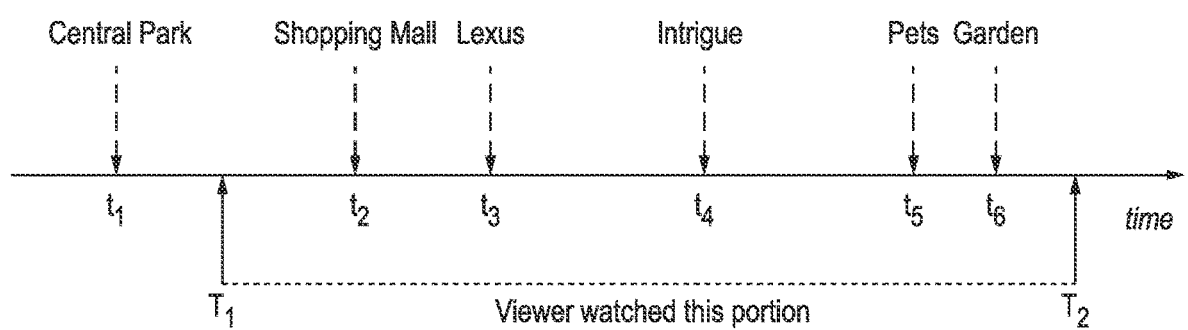
FIG. 1 illustrates an example association between metadata and content in time.

For example, imagine an item of content that contains a scene-level metadata timeline as shown in FIG. 1. FIG. 1 illustrates a simple time axis chart illustrating the timeline for the delivery of content. The chart has one axis which corresponds to a timeline. At time $t_1$ metadata identifying 'Central Park' is associated with the content; at time $t_2$ metadata associated with a 'shopping mall' is associated with the content; at time $t_3$ metadata associated with 'Lexus' is associated with the content; at time $t_4$ metadata is associated with the content indicating 'intrigue'; at time $t_5$ metadata is associated with the content indicating 'pets'; and at time $t_6$ the content is associated with a metadata tag indicating 'garden' content. As also shown in FIG. 1, the user consumes the content, i.e. watches the content in this example, for a period from time $T_1$ to time $T_2$, time $T_1$ being between times $t_1$ and $t_2$, and time $T_2$ being after time $t_6$.

The user only watches the marked portion from $T_1$ to $T_2$ and positively rates their experience of the show. The user's feedback rating may be received at or around time $T_2$.

Figure 2:
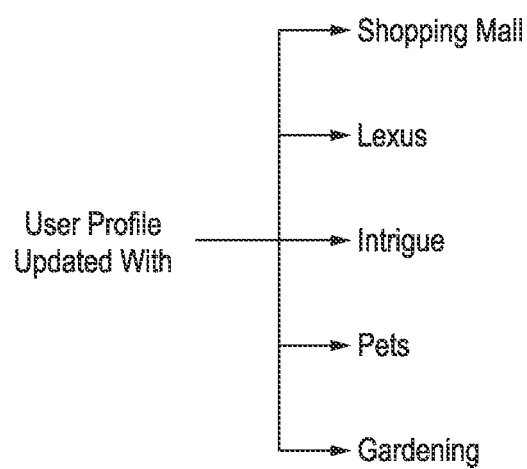
FIG. 2 illustrates the an example allocation of a user profile to metadata consistent with the example of FIG. 1.

As a result, the improved user profile service stores this feedback against the keywords, themes and tags associated with the metadata contained within that section as shown in FIG. 2. As shown in FIG. 2, the user profile is updated with metadata associated with 'shopping mall, 'Lexus', 'intrigue', 'pets' and 'gardening'.

A recommendation system that has access to this user profile data now has a more accurate picture of what the user intended to rate and, as a result, is less likely to recommend things which fall outside of this. In the example of Figures, the recommendation engine is no more likely to recommend other pieces of content which feature 'Central Park' after the user rated this piece of content, because that tag was outside the viewed area and therefore no rating was added to the user profile as a result.

Figure 3:
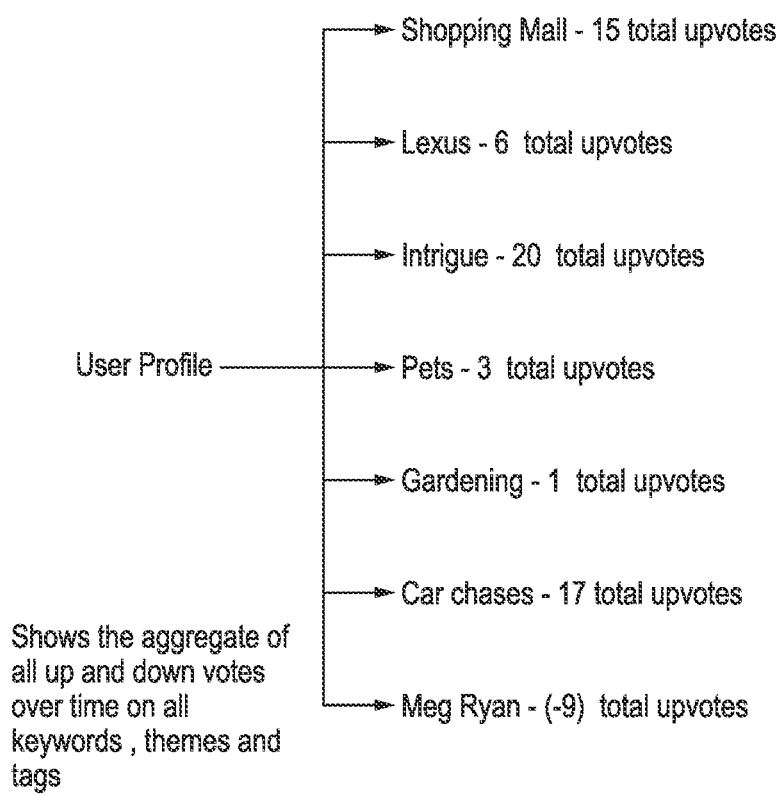
FIG. 3 illustrates an example allocation and adjustment of metadata for a user.

Over time, as a user rates and otherwise provides feedback on content, their user profile may look like the example shown in FIG. 3. FIG. 3 illustrates the aggregate of all up and down votes over time for a particular user, based on all keywords, themes and tags. An example set of such keywords, themes and tags is shown in FIG. 3. In FIG. 3, for a given user profile, there is associated the keyword 'shopping mall' having 15 total upvotes; the keyword 'Lexus' having 6 total upvotes; the theme 'intrigue' having 20 total upvotes; the tag 'pets' having 3 total upvotes; the theme 'gardening' having 1 total upvote; the theme 'car chases' having 17 total upvotes; and the keyword 'Meg Ryan' having −9 total upvotes.

However, there is a further sophistication that can be added.

A long movie or TV programme may contain many themes and keywords even during the portion the user watched. The moment at which the user chooses to provide feedback tells us something about their motivation to do so.

For example, a viewer is watching 'Hannibal, Season 3, Episode 2' and hits 'Do not like' at the fifteen minute mark but continues to watch.

A traditional user profile system would take this as a down vote for the episode as a whole. However, with the same scene-level data used above, it becomes possible to associate the feedback more with the themes in play at the time and thereby affects the user's profile more meaningfully.

Figure 8:
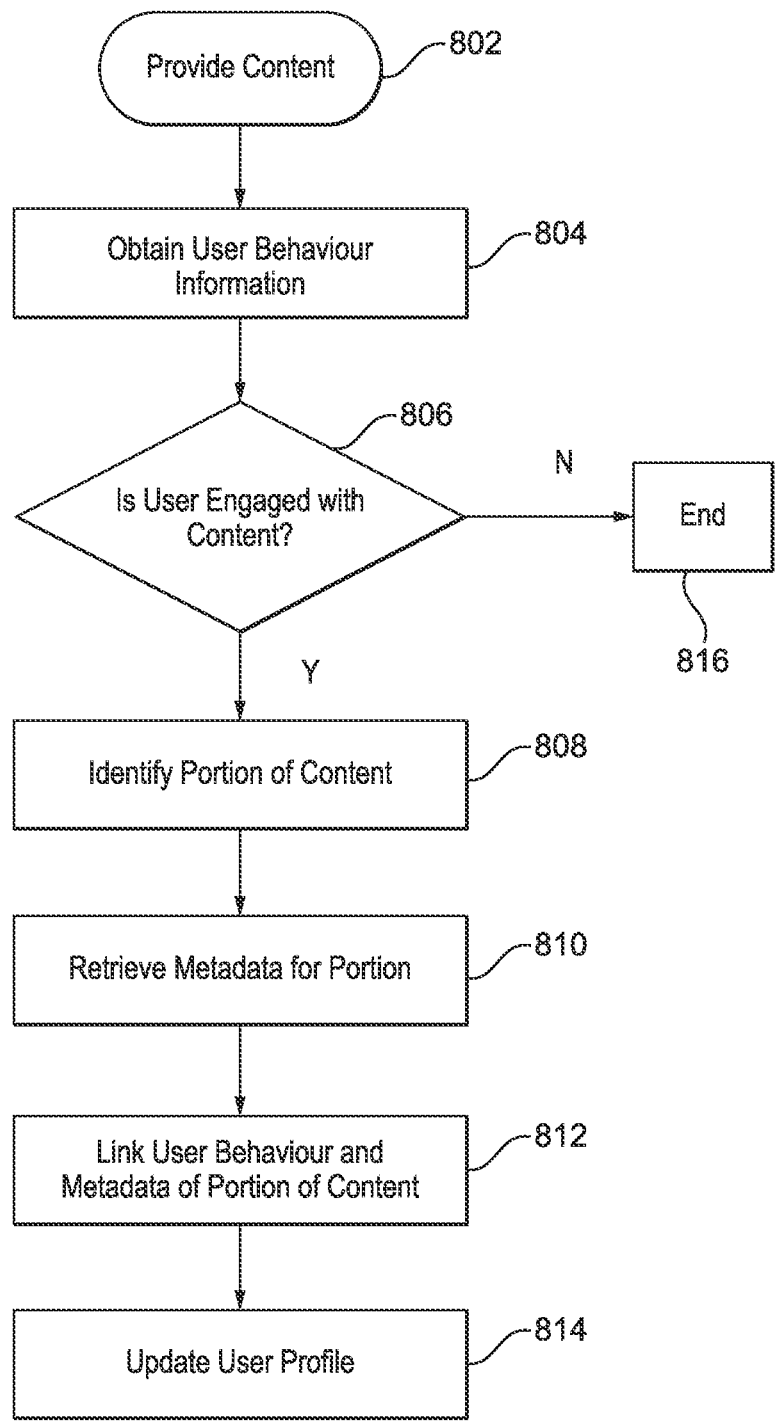
FIG. 8 is an example process for allocating metadata for enhancing a user profile.

As illustrated in FIG. 8, in a step 802 content is provided to a user. In a step 804 user behaviour information associated with the user is obtained.

In a step 806 a determination is made as to whether the user is engaged with the content, which determination is made based on an assessment of the user behaviour. If it is determined in step 806 that the user is engaged with the content, then in step 808 a determination is made as to what portion of content the user is engaged with. In step 810 the metadata for that portion is then retrieved.

In a step 812 the user behaviour is then linked with the user behaviour.

In a step 814, the user profile for the user is then updated based on this linking. The user profile is adapted in accordance with known techniques in order to improve the store of user data based only on the portion of content for which the user is engaged. Based on these updates made to the user profile, the inference of user recommendations is thus improved.

If in step 806 it is determined that the user is not engaged with the content then the process ends in step 816.

Figure 4:
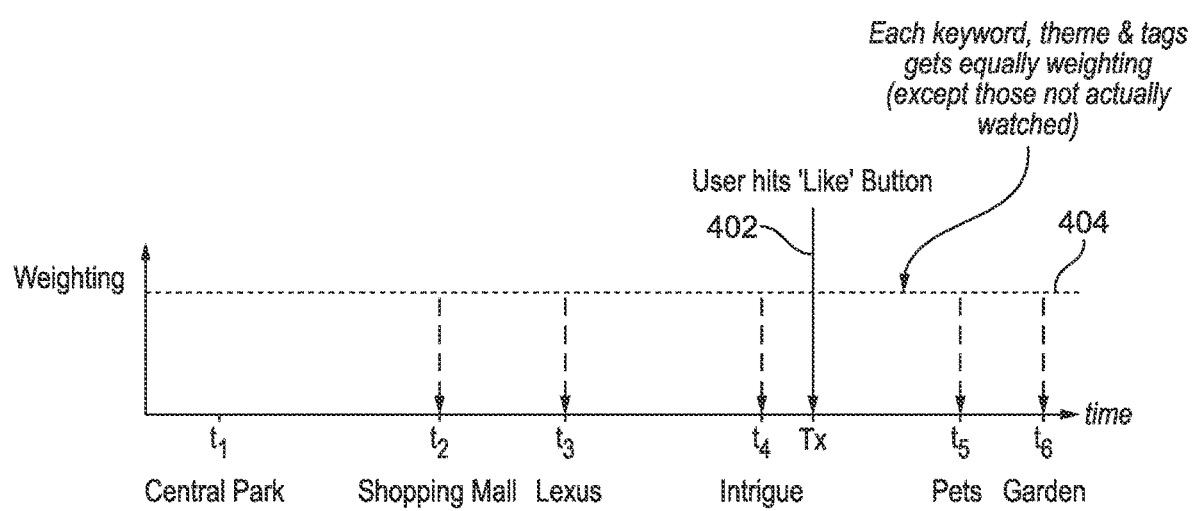
FIG. 4 is an example illustration of allocation of metadata for an enhancing a user profile without weighting.

With reference to FIG. 4, the simple time axis chart of FIG. 1 is expanded on to show time in an x-axis as with FIG. 1, but to additionally show weighting in a y-axis. In addition, the time line (x-axis) of FIG. 4 shows a time $T_X$ denoted by arrow 402 at which the user 'hits' the like button. As known in the art, the user may hit a physical button on their device or may select an icon on their display to illustrate that they 'like' something associated with the content.

As shown in FIG. 4 there is indicated a horizontal dashed line denoted by reference numeral 404, which has a fixed value on the y-axis. This illustrates a weighting applied to each metadata value, and in this example this weighting is constant: each metadata value is allocated the same weighting.

However, an improved system might weight the effect that such feedback has depending on the time at which the feedback was made and the keywords, themes and tags in play at that moment. The resultant effect can be seen below where each keyword, theme and tag nearer to the feedback receives more weight than those further away. See FIG. 5.

Figure 5:
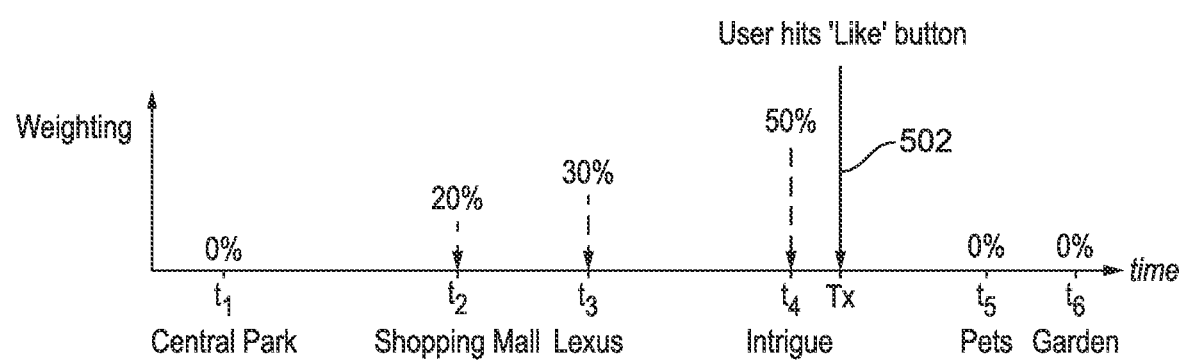
FIG. 5 is an example illustration of allocation of metadata for enhancing a user profile with weighting.

With reference to FIG. 5, the simple time axis chart of FIG. 1 is again expanded on to show time in an x-axis as with FIG. 1, and to additionally show weighting in a y-axis. The time line (x-axis) of FIG. 5 shows the time $T_X$ at which the user 'hits' the like button.

FIG. 5 illustrates now how weighting is then applied. At time $t_1$ it has been determined that the viewer is not consuming content, and so the 'Central Park' metadata is given zero weighting. Similarly the feedback occurs at a time $T_X$ before times $t_5$ and $t_6$, and so the feedback cannot relate to the metadata at times $t_5$ and $t_6$: the 'pets' and 'gardening' metadata is thus given zero weighting.

Weighting is applied to the metadata at times $t_2$, $t_3$ and $t_4$. This metadata all occurred in a time window before the user feedback during which the user was engaged with the content. In this example the weighting is applied to give a heavier weighting (or higher relevance) to the metadata captured most recently, i.e. closest to time $T_X$, and a lower weighting to the metadata captured least recently, i.e. further away from time $T_X$ in the time window. Thus the metadata 'shopping mall' gets a weighting of 20%, the metadata 'Lexus' gets a weighting of 30%, and the metadata 'intrigue' gets a weighting of 50%. The way in which the weighting is proportioned will be implementation dependent. Preferably a 100% of weighting is proportionately allocated to all metadata in the window, in accordance with the amount of metadata and its proximity to the feedback.

Figure 9:
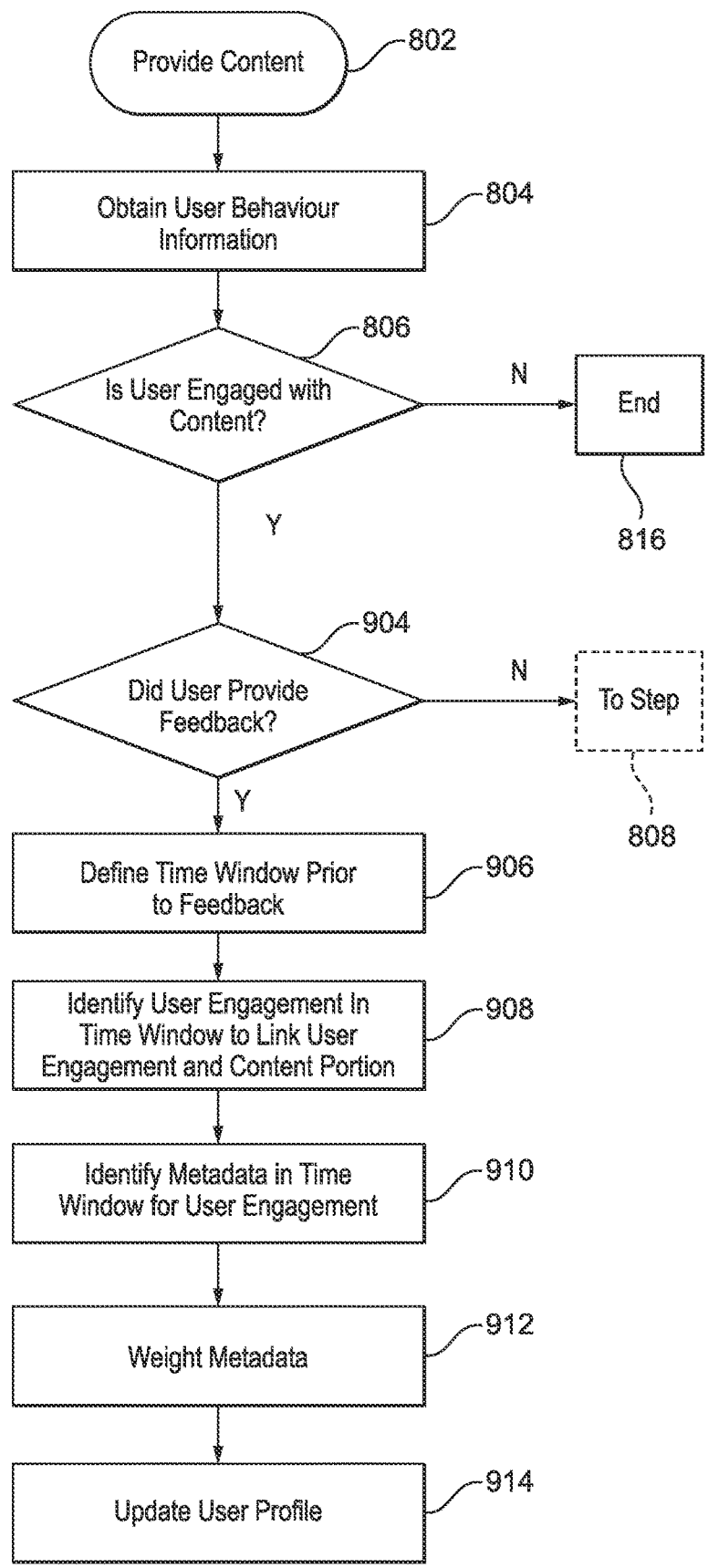
FIG. 9 is an example process for allocating metadata with weighting for enhancing a user profile.

An alternative process associated with FIG. 5 is illustrated in FIG. 9. In FIG. 9 steps 802 to 806 of FIG. 8 are followed, and if it is identified that the user is engaged with content in step 806 then in a step 904 it is determined whether the user provides feedback. If no user feedback is received, then the process reverts to step 808 of FIG. 8, and continues from there. The nature of a request to provide this feedback may vary, and for example it may simply ask the user to provide a satisfaction score of how they rate the content so far. The generation of such requests is known in the art.

If the user does provide feedback, then the process moves on to step 906. In step 906, a time window prior to the feedback is defined. It may be intended that the query relates to a particular event within the content, and the start of the time window corresponds to when that event occurred in the content, and the end of the time window corresponds to when the user feedback was received. The length of the time window may vary.

In a step 908 the user engagement within the time window is identified, to link the user behaviour and one or more portions of content within the time window.

In step 910 the metadata for the linked use behaviour and the content portion is retrieved.

In step 912 the identified metadata is weighted. The metadata may be weighted based on the proximity of the metadata within the time window to the end of the time window. Thus metadata which is more recently associated with the feedback is weighted more heavily (to have a higher relevance) than metadata less recently associated with the feedback (to have a lower relevance).

In step 914 the user profile is adapted in accordance with known techniques in order to improve the store of user data based only on the portion of content for which the user is engaged, and based on the linked weighted metadata. Based on these updates made to the user profile, the inference of user recommendations is thus improved.

In this example the metadata is weighted based on a time window having an end point at which user feedback is received following a query being put to a user. Metadata may also be weighted in alternative techniques. For example metadata may simply be weighted based on a time window, based on proximity to a capture point in time.

In this example, it can be seen that the user profile of a user, in response to positive user feedback, might be affected such that each keyword, theme and tag experienced during the watched portion of the content receives the same degree of uptick (or upvote). This is further illustrated in FIG. 4.

This weighting of the effects of user feedback has other uses. For example, as a TV show draws to a close, the content provider may wish to encourage the viewer to watch something else. By picking out other items of content that share themes and keywords with the later part of the show just watched, it may be easier for the viewer to appreciate the value and interest of these recommendations and, as a result, act upon them.

Moreover, consider a programme that is occasionally interrupted by ad breaks. A given viewer has watched a particular part that began with an on-screen character enjoying a cup of coffee but which subsequently featured someone drinking a glass of orange juice while sitting besides a pool just before the programme cut to the break. An ad selection process that picks out adverts to show to each viewer individually may be able to choose ads that are more likely to attract a positive engagement by understanding what the viewer had in mind most recently. If such an ad system has a choice between a Nespresso or a Tropicana advert, it is clear that it should choose the latter—the ability to make this choice is dependent on a weighted assessment of the viewer's experience of the content.

Figure 6:
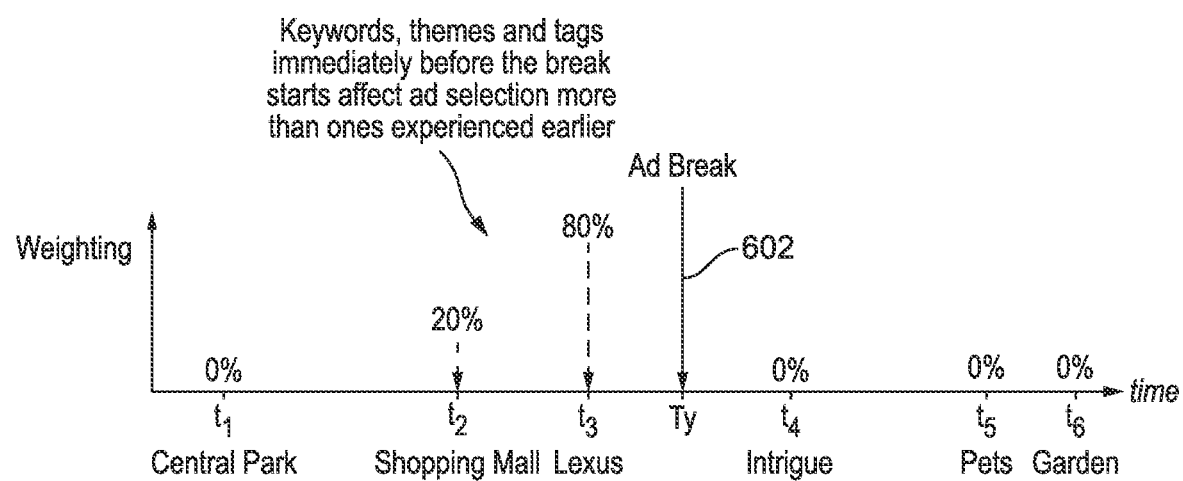
FIG. 6 is an example illustration of allocation of metadata with weighting to enhance an advert selection.

When heading into an ad break, an ad selection process might receive a similar input of data that collects together all the keywords, themes and tags observed by the user during that portion of the part they watched but skewed towards those experienced more recently as shown In FIG. 6.

With reference to FIG. 6 there is illustrated a similar chart to FIG. 5, having time on an x-axis and weighting on a y-axis. As denoted by reference numeral 602, at time $T_Y$ an ad break is displayed. Time $T_Y$ is between time $t_3$ and time $t_6$.

Keywords, themes and tags immediately before the break starts affect the ad selection more than ones experienced earlier. Again, at time $t_1$ it has been determined that the viewer is not consuming content, and so the 'Central Park' metadata is given zero weighting. Similarly the feedback occurs at a time $T_Y$ before times $t_4$, $t_5$ and $t_6$, and so the feedback cannot relate to the metadata at times $t_4$, $t_5$ and $t_6$: the 'intrigue', 'pets' and 'gardening' metadata is thus given zero weighting.

Weighting is applied to the metadata at times $t_2$ and $t_3$. A weighting of 80% is given to the metadata data at time $t_3$ closest to time $T_Y$, and a weighting of 20% is given to the metadata at time $t_2$ furthest from time $T_Y$.

Figure 10:
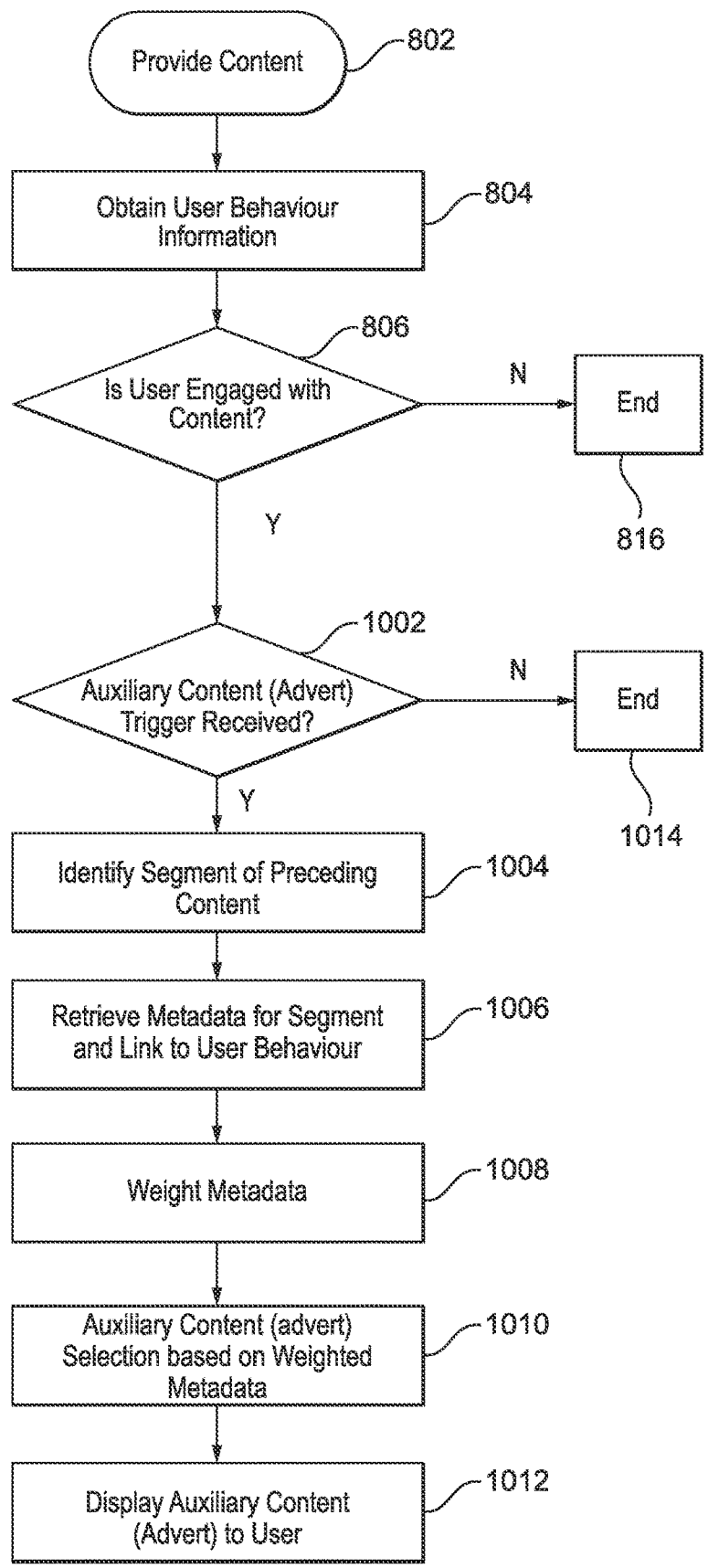
FIG. 10 is an example process for allocating metadata with weighting to select an advert.

A further alternative process associated with FIG. 6 is illustrated in FIG. 10. In FIG. 10 steps 802 to 806 of FIG. 10 are followed, and if it is identified that the user is engaged with content in step 806 then in a step 1002 a determination is made as to whether an advert is triggered for display to the user. In general terms, an advert is an example of auxiliary content to be displayed to the user. The triggering of an advert in association with content is known.

If in step 1002 it is determined that the display of auxiliary content, in the described example an advert, is triggered, then in step 1004 a segment of the preceding content is identified. This segment may be the portion of content since the last display of an advert, for example.

In a step 1006 the metadata for that portion for which the user is engaged is retrieved, and thus the user behaviour and metadata are linked.

In step 1008 the identified metadata is weighted. The metadata may be weighted based on the proximity of the metadata within the segment to the point in time at which the advert is to be displayed. Thus metadata which is more recent in time is weighted more highly than metadata which is less recent in time.

After weighting of the metadata, the weighted metadata is used to select the auxiliary content in step 1010, such as an advert. The weighted metadata may be used in combination with other selection parameters in step 1010.

In a step 1012 the selected auxiliary content, such as an advert, is displayed to the user.

If in step 1002 it is determined that an auxiliary content trigger is not received, then the process ends on step 1014.

Figure 7:
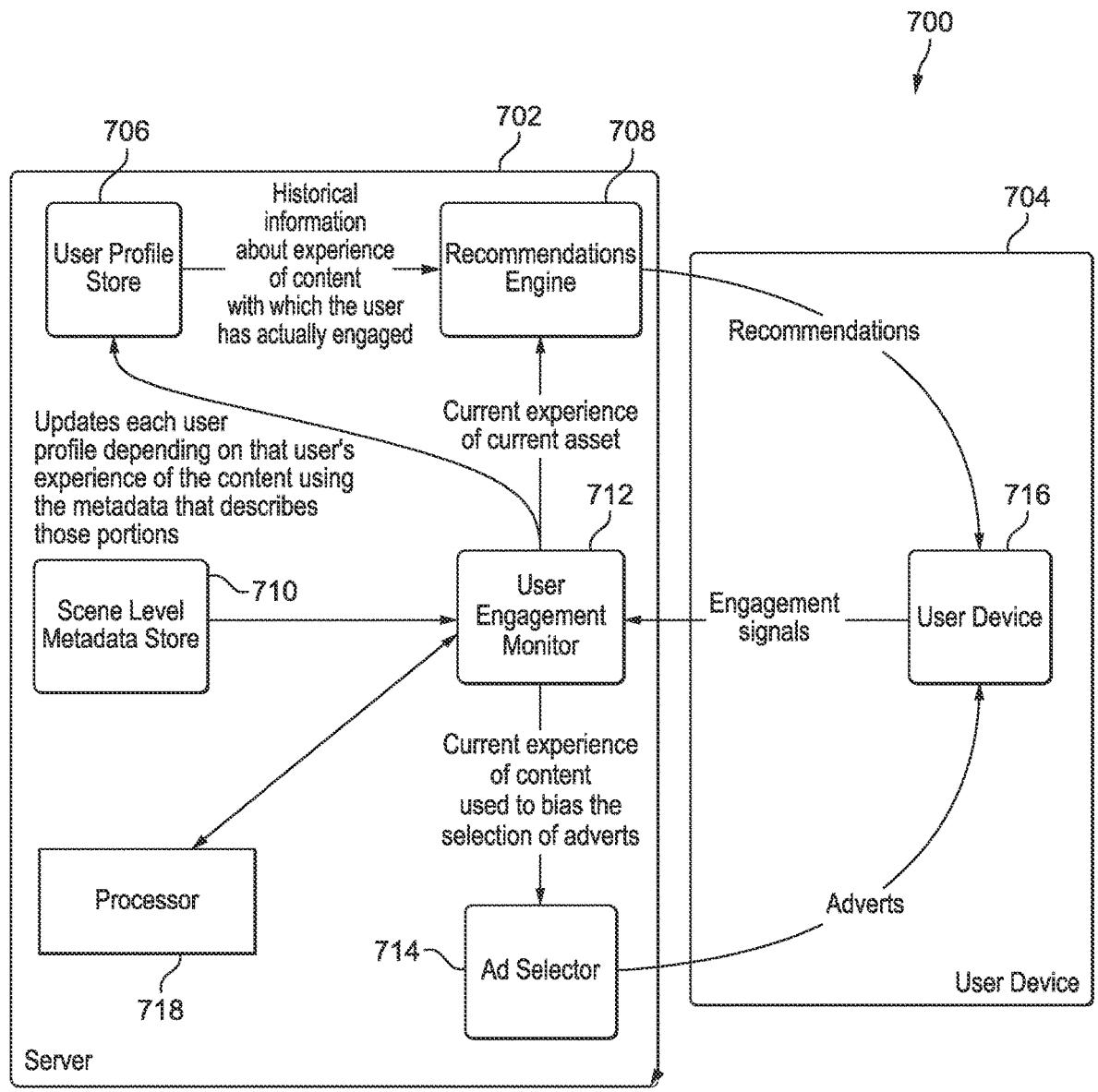
FIG. 7 is an example architecture for implementing a system.

FIG. 7 illustrates an example architecture diagram of an example system 700 for implementing any of the above techniques. The system 700 comprises a server 702 and at least one user device 704. The server 700 comprises one or more server units located at one or more sites. The user terminal may take any suitable form such as a smartphone, tablet, laptop, desktop computer or set-top box. The server and user device are arranged to communicate with one another via a network, preferably a wide area network or internet network such as that commonly referred to as the Internet.

The server 702 comprises a user engagement monitor module 712, and a scene level metadata store 710. The server 702 may also comprise a user profile store 706, a recommendations engine 708, and/or an ad selector 714. The server 702 additionally includes a processor 718. Each of these modules may be implemented in the form of code embodied on a memory of the server and arranged to execute on one or more processors of the server.

The user device 704 is illustrated as including a user device module 716.

As shown in FIG. 7, the user engagement monitor 712 receives engagement signals from the user device module 716, indicating the user engagement with delivered content. The user engagement module 712 is connected to provide inputs to one or more of the processor 718, recommendations engine 708, the user profile store 706, the scene level metadata store, and the ad selector 714. The user engagement module 712 may be considered as an interface, which operates in conjunction with the processor 718.

The user engagement monitor 712 provides updates for each user to the user profile store, depending on the user's experience of the content using the metadata that described those portions or parts of the content.

The recommendations engine 708 receives historical information about experience of content with which the user has actually engaged from the user profile store 706.

The ad selector 714 receives a current experience of content used to bias the selection of adverts from the user engagement monitor 712.

The recommendations engine 708 provides recommendations to the user device module 716, and the ad selector provides adverts to the user device module 716.

The user engagement module 712 optionally provides a current experience of a current asset to the recommendations engine.

In operation, the server 702 and its various modules are configured to act as follows.

The server 702 may play out a piece of content to the user device over the network, e.g. a particular episode of a TV show, or a particular film. There is no limitation to how the content is delivered to the user. In this example it is described as being delivered from the server, but this is not limiting.

The user engagement monitor module 712 receives scene level metadata from the scene level metadata store 710, wherein this metadata identifies where one or more events occurring within the content (e.g. when there is car chase, love scene or explosion, or where adverts occur). It will be understood that an event is an example, and in general a metadata characteristic is identified.

The user engagement module 712 also receives engagement signals from the user device 704, wherein these indicate when the user has consumed the content and/or when the user of the device has interacted with the content (e.g. given feedback).

Based on comparing the metadata and engagement signals, for which comparison the user engagement module may cooperate with the processor 78, the user engagement module 712 determines a measure of association between the two, e.g. a measure of the degree of the user's engagement with the content corresponding to the metadata. For instance, if the user only watched the first or last 10 minutes, or only caught the main car chase or love scene identified by the metadata, then the system may be determine that the user's feedback is more correctly associated with the indicated events than if the user watched more of the content.

The implementation of the architecture of FIG. 7 will be understood from the above description.

In one embodiment, based on the determined association between the metadata and user engagement, the user engagement module 712 outputs an indication of the user's current experience of the content to the advert selector 714. The advert selector 714 then uses this to bias the selection of adverts to play out to the user through his or her user terminal (either during the rest of the current piece of content, e.g. current show or film, or during one of the next pieces of content the user consumes, e.g. one of the next shows or films the user watches).

Alternatively or additionally, the user engagement module 712 outputs an indication of the user's current experience of the content to the recommendation engine 708 (again based on the determined association between the metadata and user engagement). Based on this, the recommendation engine then determines a recommendation of another piece of content. Preferably, the user engagement module 712 updates the user profile in the user profile store, and this is then accessed by the recommendation engine.

Optionally, the recommendation engine also takes into account historical information about the user's experience of past content, specifically with the parts of that content with which the user has engaged, wherein this information is provided from a profile of the user as stored in the user profile store. In this case the recommendation is based on both the current experience of the currently consumed piece of content as indicated from the user engagement module, and also on the historical engagement information from the user profile store relating to one or more previously consumed pieces of content. Alternatively or additionally, a similar arrangement may be implemented in relation to the advert selector—i.e. the selected advert(s) may be based on both the current experience of the currently consumed piece of content as indicated from the user engagement module, and also on the historical engagement information from the user profile store relating to one or more previously consumed pieces of content.

It can be understood that the processor 718 provides processing functionality to the user engagement monitor 712, which may in fact be part of the user engagement module. In addition, the user engagement module 712 is an interface for receiving engagement signals from the user device module 716.

It will be appreciated that the above embodiments have been described only by way of example. Other variants or applications may become apparent to a person skilled in the art given the disclosure herein. The scope of the disclosure is not limited by the described embodiments, but only by the accompanying claims.

The invention claimed is:

1. A method in a recommendation system comprising:
receiving one or more items of metadata associated with an item of content currently being delivered to a user, each of the items of metadata identifying a characteristic of a part of the item of content;
receiving user behaviour information corresponding to an engagement of the user with the item of content currently being delivered to the user;
determining a segment of the item of content currently being delivered to the user prior to the receipt of the user behaviour information with which the user has engaged;
determining a plurality of content parts of the item of content within that segment currently being delivered to the user prior to the receipt of the user behaviour information with which the user has engaged;
identifying a plurality of items of metadata each respectively associated with each part of the item of content within that segment currently being delivered to the user with which the user has engaged;
weighting each identified item of metadata for that segment separately in dependence on time proximity of the associated content part of the item within the segment to the received user behavior information, wherein items of metadata in the segment associated with those content parts of the item of content within the segment currently being delivered to the user more recent to the received user behaviour information are weighted to have a higher relevancy than items of metadata in that segment associated with those content parts of the item of content within the segment currently being delivered to the user less recent from the received user behaviour information; and selecting auxiliary content for display to the user following the segment currently being delivered to the user in dependence at least in part on the weighted metadata for each part of the item of content within the segment.

2. The method of claim 1 wherein a user profile for the user is updated based on the weighted metadata.

3. The method of claim 2 wherein the user behaviour comprises user feedback.

4. The method of claim 1, wherein metadata associated with parts of the item of content within the segment currently being delivered to the user prior to the receipt of the user behaviour information with which the user has not engaged are not weighted.

5. The method of claim 2 wherein future recommendations for the user are based on the updated user profile.

6. The method of claim 1 further comprising:
selecting auxiliary content for display to the user within the segment currently being delivered to the user in dependence at least in part on the weighted metadata for each part of the item of content within the segment.

7. The method of claim 1 wherein the metadata is weighted in dependence on time proximity to an end of that part of the item of content within the segment currently being delivered to the user, wherein metadata more recent to the end of that part of the item of content within the segment currently being delivered to the user is weighted to have a higher relevancy than metadata less recent from the end of that part of the item of content within the segment currently being delivered to the user.

8. The method of claim 1 wherein the auxiliary content is an advert.

9. A computer program product embodied on a computer-readable storage medium and configured so as when run on one or more processors to perform the operations of claim 1.

10. A server of a recommendation system comprising:
a metadata store for providing one or more items of metadata associated with an item of content currently being delivered to a user, each of the items of metadata identifying a characteristic of a part of the item of content;
an interface for receiving user behaviour information corresponding to an engagement of the user with one or more parts of the item of content currently being delivered to the user; and
a processor for linking the metadata to the user behaviour in dependence on user engagement for the part of the item of the content currently being delivered to the user associated with the metadata, the processor configured to:
determine a segment of the item of content currently being delivered to the user prior to the receipt of the user behaviour information with which the user has engaged;
determine a plurality of content parts of the item of content within that segment currently being delivered to the user prior to the receipt of the user behaviour information with which the user has engaged;
identify a plurality of items of metadata associated each respectively with each part of the item of content within that segment currently being delivered to the user with which the user has engaged;
weight each identified item of metadata for that segment separately in dependence on time proximity of the associated content part of the item within the segment to the received user behaviour information, wherein items of metadata in that segment associated with those content parts of the item of content within that segment currently being delivered to the user more recent to the received user behaviour information are weighted to have a higher relevancy than items of metadata in that segment associated with those content parts of the item of content within the segment currently being delivered to the user less recent from the received user behaviour information; and
select auxiliary content for display to the user following the segment currently being delivered to the user in dependence at least in part on the weighted metadata for each part of the item of content within the segment.

11. The server of claim 10 further comprising:
a user profile store, wherein a user profile in the user profile store is updated based on the weighted metadata.

12. The server of claim 11 wherein the user behaviour information includes user feedback.

13. The server of claim 10 wherein the processor is configured not to weight metadata associated with parts of the item of content within that segment currently being delivered to the user prior to the receipt of the user behaviour information with which the user has not engaged.

14. The server of claim 11 further comprising:
a user recommendations engine configured to base future recommendations for the user on the updated user profile in the user profile store.

15. The server of claim 10 wherein the processor is configured to select auxiliary content for display to the user within the segment currently being delivered to the user in dependence at least in part on the weighted metadata for each part of the item of content within the segment.

16. The server of claim 10 wherein the processor is configured to weight the metadata in dependence on time proximity to an end of that part of the item of content within that segment currently being delivered to the user, wherein metadata more recent to the end of that part of the item of content within that segment currently being delivered to the user is weighted to have a higher relevancy than metadata less recent from the end of that part of the item of content within that segment currently being delivered to the user.

17. The server of claim 10 wherein the auxiliary content is an advert.

18. The method of claim 1 wherein metadata associated with parts of the item of content within the segment currently being delivered to the user after the receipt of the user behaviour information are not weighted.

* * * * *